United States Patent [19]

Kitagawa et al.

[11] Patent Number: 4,463,604
[45] Date of Patent: Aug. 7, 1984

[54] LIQUID QUANTITY DETECTING APPARATUS

[75] Inventors: Junji Kitagawa; Shigeyuki Akita, both of Okazaki; Sotoo Kitamura, Aichi, all of Japan

[73] Assignee: Nippon Soken, Inc., Nishio, Japan

[21] Appl. No.: 384,387

[22] Filed: Jun. 2, 1982

[30] Foreign Application Priority Data

Jun. 9, 1981 [JP] Japan ................................. 56-89342

[51] Int. Cl.³ ........................................... G01F 23/20
[52] U.S. Cl. ..................................... 73/296; 177/211
[58] Field of Search ............... 73/296, 862.53, 862.54, 73/862.64; 177/211

[56] References Cited

U.S. PATENT DOCUMENTS 3,103,984 9/1963 Ellis et al. ........................... 177/211

Primary Examiner—S. Clement Swisher
Assistant Examiner—Joseph W. Roskos
Attorney, Agent, or Firm—Cushman, Darby & Cushman

[57] ABSTRACT

In a liquid quantity detecting apparatus, a torsion bar is mounted on a stationary structure to support a container thereon in such a manner that the torsion bar is twisted at a torsional angle in dependence upon the weight of liquid stored within the container. An electric detector is provided to electrically detect the torsional angle of the torsion bar so as to generate an output signal indicative of the quantity of the stored liquid based on the detected torsional angle.

5 Claims, 14 Drawing Figures

U.S. Patent  Aug. 7, 1984  Sheet 1 of 5  4,463,604
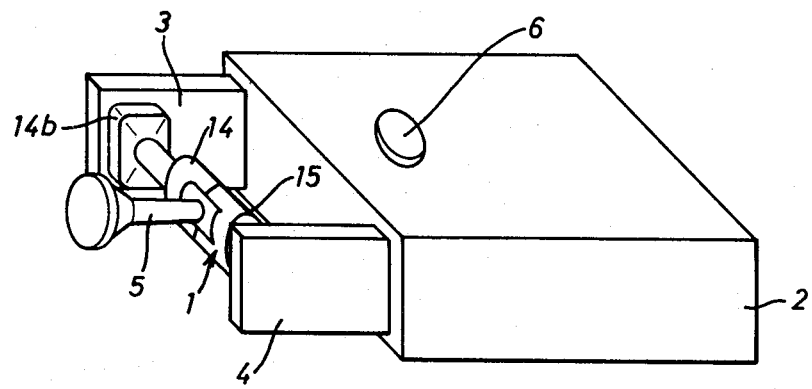
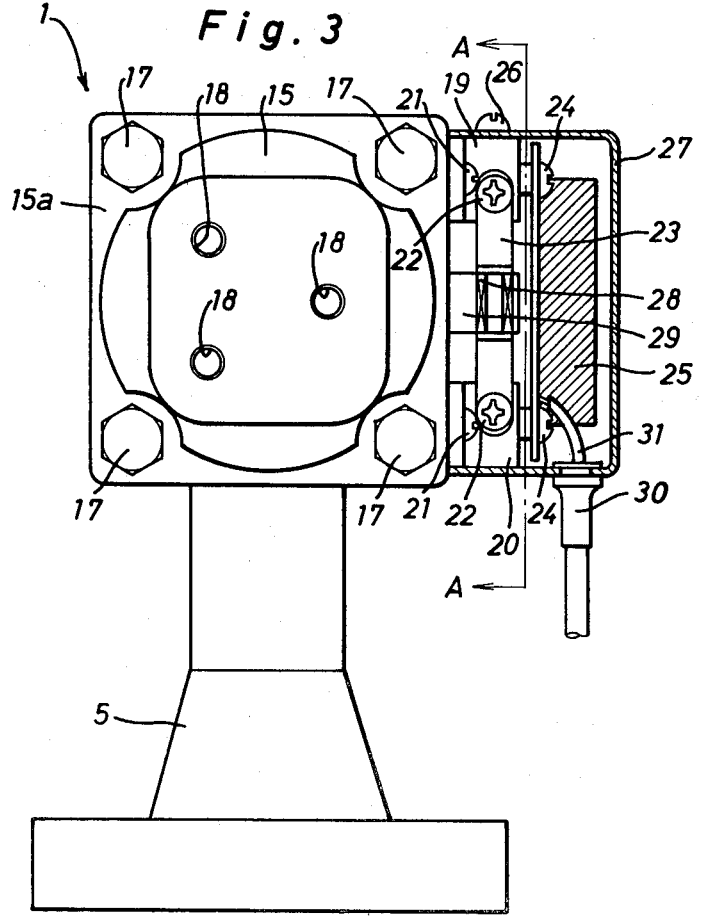

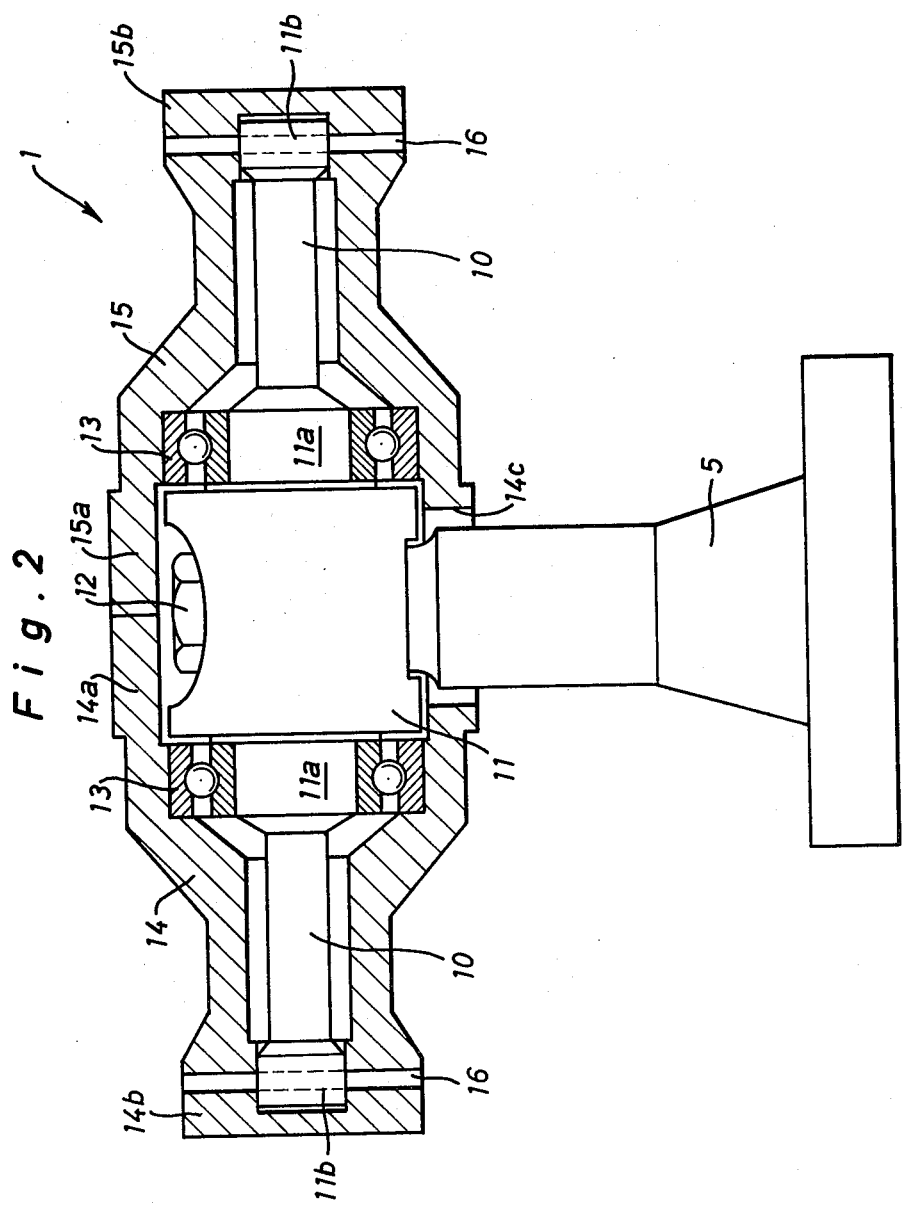

LIQUID QUANTITY DETECTING APPARATUS

BACKGROUND OF THE INVENTION

The present invention relates to liquid quantity detecting apparatuses, and more particularly to a liquid quantity detecting apparatus for electrically detecting a quantity of liquid stored in a container.

As one of conventional liquid quantity detecting apparatuses of this kind, a fuel detector has been proposed, which comprises a resistor element assembled within a liquid fuel tank, and a float member floated on the surface of liquid fuel stored in the tank and provided thereon with a contact element in slidable connection with the resistor element. In such fuel detector, the quantity of the stored liquid fuel is detected by change of a resistance value of the resistor element in dependence upon displacement of the float member. For the purpose of detecting the liquid fuel quantity, it is necessary to modify the shape of the resistor element in relation to each inner peripheral wall of various liquid containers. In the actual practices, defacement in sliding connection between the float and resistor elements occurs an error in operation of the fuel detector.

SUMMARY OF THE INVENTION

It is, therefore, a primary object of the present invention to provide a liquid quantity detecting apparatus which is constructed to be adaptable to various kinds of containers in a simple manner to detect a quantity of liquid stored in the container without causing an error in detection for a long period of time.

According to the present invention, there is provided an apparatus for detecting a quantity of liquid stored within a container, which comprises:

a torsion bar mounted on a stationary structure for supporting the container thereon in such a manner that the torsion bar is twisted at a torsional angle in dependence upon the weight of the stored liquid within the container; and an electric detector for electrically detecting the torsional angle of the torsion bar to generate an output signal indicative of the quantity of the stored liquid based on the detected torsional angle.

In the actual practices of the present invention, it is preferable that the electric detector comprises:

a signal generator for generating a series of electric signals;

first and second coils respectively mounted on the stationary structure and a portion of the container, one of the coils being arranged to produce magnetic fluxes therefrom in response to each of the electric signals from the signal generator, and the other coil being arranged to be in an interlinkage relationship with the magnetic fluxes and to detect the number of magnetic fluxes in its interlinkage caused by relative displacements between the coils so as to produce an electric signal indicative of the detected number of the magnetic fluxes; and means for generating an output signal indicative of the quantity of the stored liquid in response to the electric signal from the other coil.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 1 illustrates perspectively a preferred embodiment of a liquid quantity detecting apparatus in accordance with the present invention which is adapted to a liquid container;

FIG. 2 is an enlarged view of a partial cross-section of the detecting apparatus shown in FIG. 1;

FIG. 3 is a partially sectional side view of the liquid quantity detecting apparatus;

DESCRIPTION OF THE PREFERRED EMBODIMENT

Figure 4:
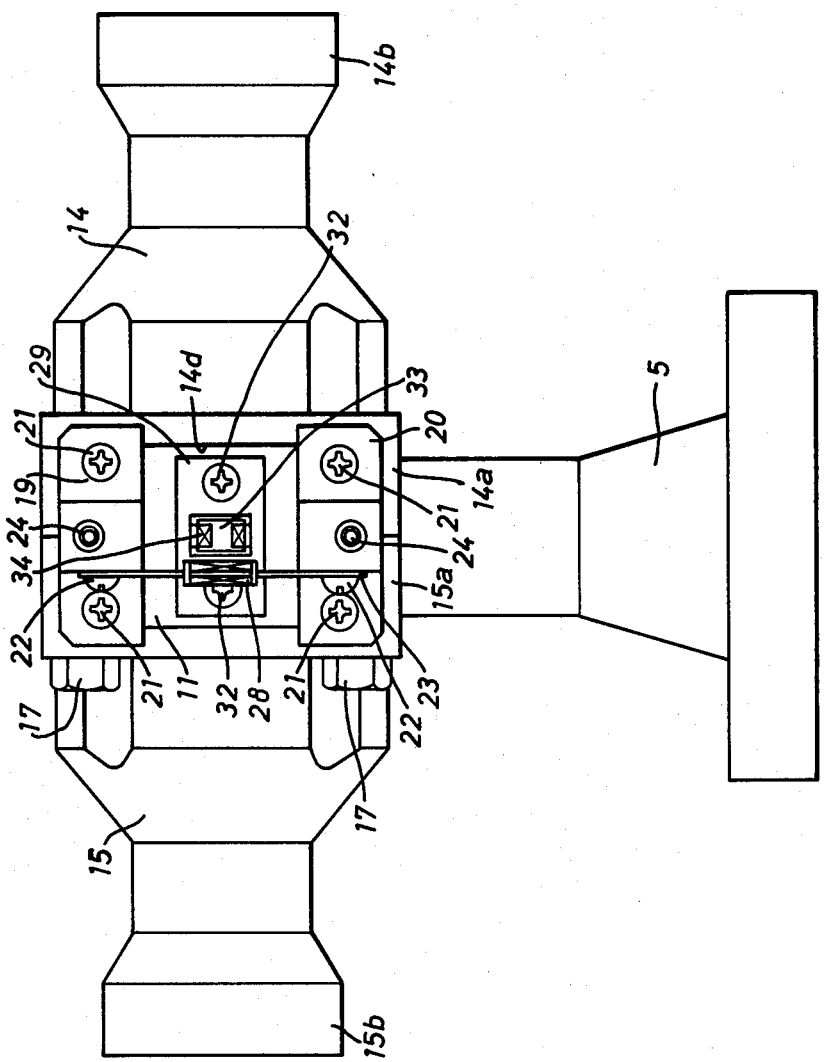
FIG. 4 is a sectional view of the detecting apparatus taken along the line A—A of FIG. 3.

Referring now to FIG. 1 of the drawings, there is illustrated a liquid quantity detecting apparatus 1 in accordance with the present invention which is adapted to detect a quantity of liquid in a liquid container 2. The detecting apparatus 1 includes a support arm 5 which is horizontally secured at its tip end portion to a stationary structure (not shown) by appropriate fastening means. The detecting apparatus 1 also includes a pair of housings 14 and 15 of which respective inner flanges 14a and 15a are assembled by bolts 17 to each other, as shown in FIGS. 1 to 4, to accomodate a torsion bar 10 in the housings 14 and 15. The housings 14 and 15 are secured at their outer end portions 14b and 15b respectively to a pair of stays 3 and 4 which are horizontally extended respectively from both end portions of a side wall of liquid container 2. Additionally, the refernce numeral 18 shown in FIG. 3 indicates respectively a threaded hole into which a bolt (not shown) is screwed by way of the stay 4.

The torsion bar 10 is provided with a central portion 11 into which a base portion of support arm 5 is inserted through a side opening 14c of the flanges 14a, 15a of housings 14, 15 and fastened by a lock nut 12, as shown in FIG. 2. The torsion bar 10 is also provided with a pair of bearing bosses 11a, 11a respectively carried rotably on ball bearings 13, 13 from inner wall shoulder portions of housings 14, 15 and with a pair of end portions 11b, 11b which are locked to the outer end portions 14b, 15b of housings 14, 15 by knock pins 16, 16 respectively. Thus, the detecting apparatus 1 cooperates with the stationary structure to horizontally hold the liquid container 2 by way of the stays 3, 4, as shown in FIG. 1, without twist of the torsion bar 10 when any liquid is not stored within the container 2. When a quantity of liquid is supplied into the container 2, the torsion bar 10 is twisted at its both end portions 11b, 11b by the container 2 clockwisely in accordance with the weight of the quantity of the supplied liquid. In the embodiment, the twisted or torsional angle of torsion bar 10 is restricted in a predetermined value due to engagement of support arm 5 with an inner peripheral portion of the side opening 14c of housings 14, 15. On lower surfaces of the flanges 14a, 15a of housings 14, 15, a pair of coil stands 19 and 20 are secured at their base portions by screws 21 spacingly in the axial direction of support arm 5, as shown in FIGS. 3 and 4, to support a first electromagnetic coil 28 by way of a bobbin 23. The bobbin 23 is secured at its both ends by screws 22 to side surfaces of upstanding portions which extend downwardly from central portions of coil stands 19, 20 respectively (See FIGS. 3, 4). The first coil 28 is wound around the bobbin 23 between the coil stands 19 and 20 to provide magnetic fluxes therefrom. Additionally, the reference numeral 6 shown in FIG. 1 indicates a screw cap by which an opening of container 2 is closed.

On the central portion of torsion bar 10, a coil stand 29 is secured at its base portion by screws 32 between the coil stands 19 and 20 within a lower opening 14d of the flanges 14a, 15a of housings 14, 15 to support a second electromagnetic coil 34 by way of a bobbin 33 adjacent to the first coil 28 (See FIGS. 3 and 4). The bobbin 33 is secured in the axial direction of torsion bar 10 on an upstanding portion which extends downward from a central portion of coil stand 29. The second coil 34 is wound around the bobbin 33 such that it is located at its axis perpendicularly to the axis of the first coil 28 to form magnetic coupling relationship with the first coil 28. In the embodiment, the first coil 28 is maintained in the original position (See (B) of FIG. 7) at which the axis of the second coil 34 crosses perpendicularly the center of the axis of the first coil 28 when the torsion bar 10 is not twisted. When the torsion bar 10 is twisted, the first coil 28 is axially displaced from the original position toward the stationary structure (or leftward as shown in (A) of FIG. 7). An electric circuit unit 25 is secured on the upstanding portions of coil stands 19, 20 by screws 24, as shown in FIG. 3, to be connected to the first and second coils 28 and 34. A leading wire 31 extends outwardly from the electric circuit unit 25 through a bush 30 assembled on a cover 27. The cover 27 is fastened at its side peripheral wall to the upstanding portions of coil stands 19, 20 by screw 26 to enclose therein the coils 28 and 24 and the electric circuit unit 25. Additionally, the bobbin 33 is provided therein with a bar of ferrite for facilitating the flow of the magnetic fluxes through the second coil 34 from the first coil 28.

Figure 5:
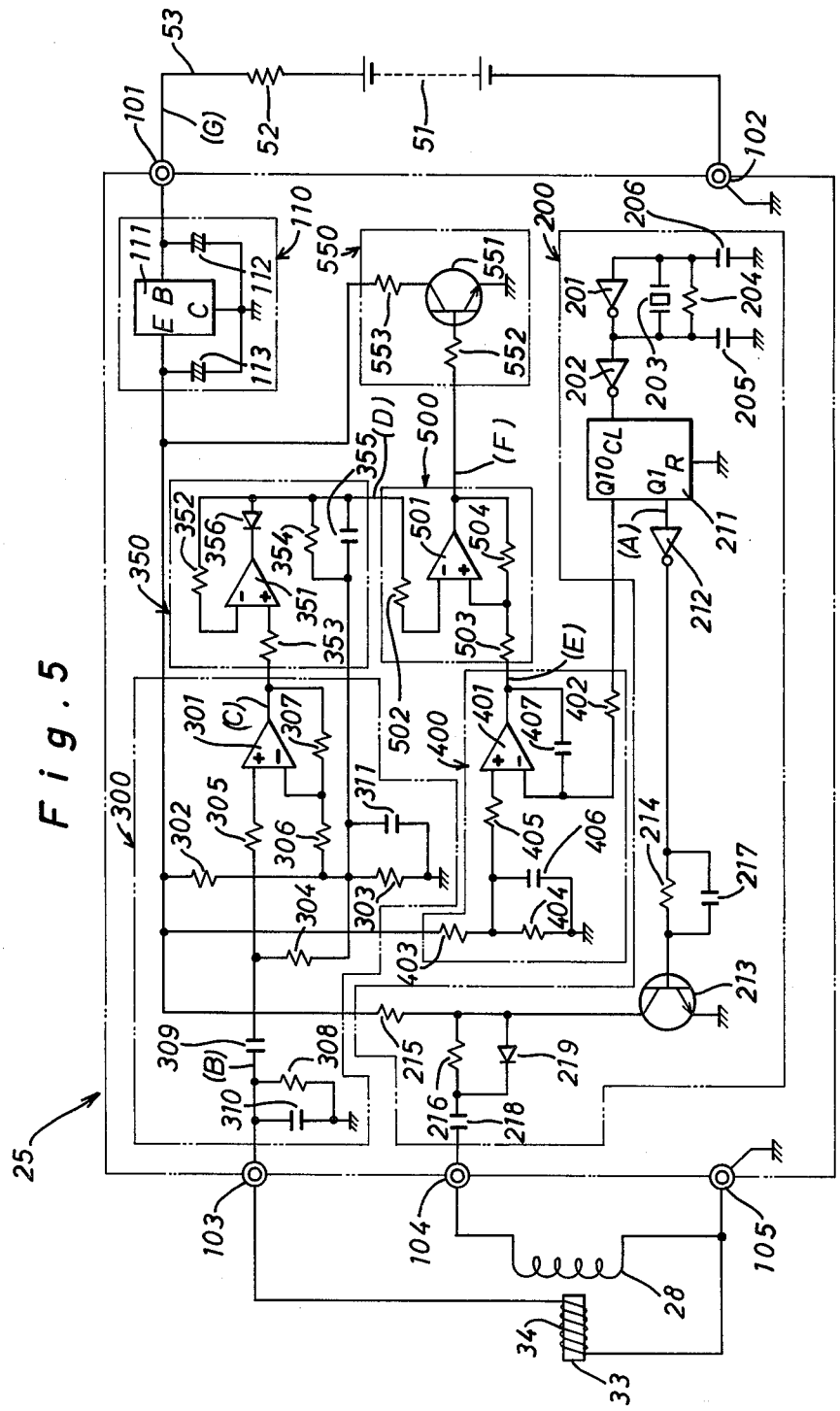
FIG. 5 is a circuit diagram of an electric circuit unit of the detecting apparatus shown in FIG. 3.
Figure 6:
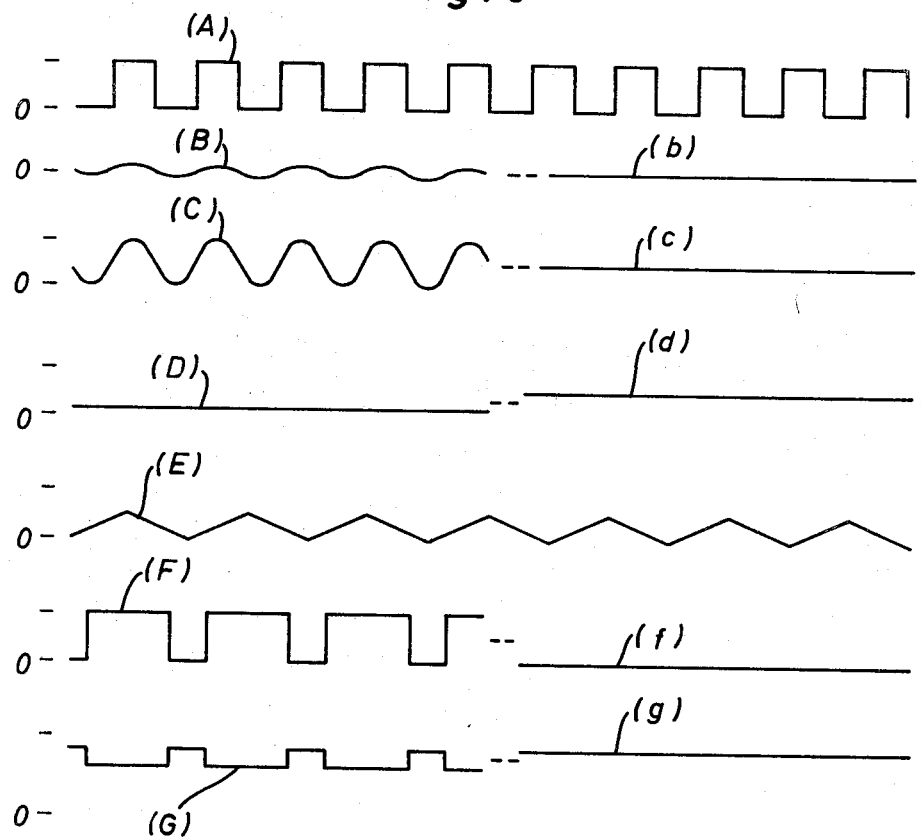
FIGS. 6A–6B depict waveforms obtained at various points in the circuit diagram of FIG. 5.

As shown in FIG. 5, the electric circuit unit 25 is provided with a constant-voltage circuit 110 and with a rectangular wave pulse generator 200 connected to the first coil 28 and the constant-voltage circuit 110. The constant-voltage circuit 110 is connected at its input terminal 101 to a terminal 53 of a current-detection resistor 52 through the leading wire 31 ( see FIG. 3). The resistor 52 is connected at its other terminal to the positive electrode of a battery 51 such that it detects an electric current therethrough from the battery 51 to generate the same current as a series of output voltage signals (G) (See FIG. 6), as described later. The constant-voltage circuit 110 includes a voltage regulator 111 which is cooperable with a pair of capacitors 112, 113 to generate a constant-voltage at its output terminal upon receiving the electric current from the battery 51 through the resistor 52. In the embodiment, as the voltage regulator 111, used is an NO7806 type voltage regulator which is manufactured by Motorola Inc. in United States of America. Additionally, the battery 51 is grounded at its remaining terminal 102.

The pulse generator 200 is provided with an oscillation circuit having inverters 201, 202, a seramic oscillator 203, a resistor 204 and capacitors 205, 206 and with a binary counter 211 connected to the oscillation circuit. When the binary counter 211 serves to count a series of oscillating signals issued from the oscillation circuit, it generates a series of first pulse signals (A) (See FIG. 6) at its output terminal $Q_1$ and also generates a series of second pulse signals at its output terminal $Q_{10}$. The pulse generator 200 is also provided with a transistor 213 of which the base is connected to the output terminal $Q_1$ of binary counter 211 through a resistor 214, a capacitor 217 and an inventer 212. The transistor 213 is connected at its collector to the output terminal of constant-voltage circuit 110 through a resistor 215 and also to an input terminal of the first coil 28 through a capacitor 218 and a parallel connection of a resistor 216 with a diode 219.

Figure 7A:
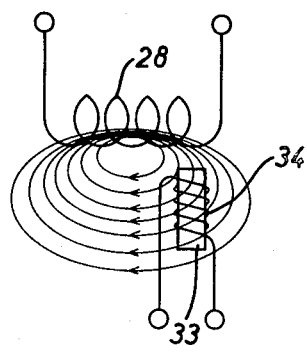
FIGS. 7A and 7B illustrate relative displacements between the first and second electromagnetic coils of FIGS. 4, 5 related to a torsional angle of the torsion bar under operation of the electric circuit unit.
Figure 7B:
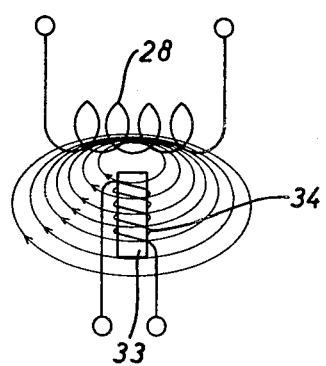

While the transistor 213 is turned off, the capacitor 218 is charged with an electric current from the constant-voltage circuit 110 through the resistor 215 and diode 219. When the transistor 213 is turned on under control of the inverter 212 responsive to each of the first pulse signals (A) from binary counter 211, the capacitor 218 discharges through the resistor 216 and transistor 213. This means that the capacitor 218 is charged with a time constant defined by a capacitance of capacitor 218 and a resistance of resistor 215 and discharges with a time constant defined by the capacitance of capacitor 218 and a resistance of resistor 216 which is substantially equal to the resistance of resistor 215. In other words, the capacitor 218 serves to generate a series of rectangular wave pulses at its output terminal 104 with the alternative charge and discharge functions thereof under control of transistor 213 responsive to a series of the first pulse signals (A) from binary counter 211. Thus, the first coil 28 serves to generate magnetic fluxes, as shown in FIG. 7, in response to a series of the rectangular wave pulses from the capacitor 218 such that the second coil 34 produces a series of electromagnetic induction voltages at its output terminal 103 in relation to the magnetic fluxes from the first coil 28. In this case, the magnitude of each of the induction voltages is defined by the number of magnetic flux interlinkages with the second coil 34, or displacement of the first coil 28 from its original position. In the embodiment, as the binary counter 211, used is a TC4020 type binary counter manufactured by Tokyo Shibaura Denki Kabushiki Kaisha in Japan. Additionally, the first coil 28 is grounded at its remaining terminal 105, and the transistor 213 is also grounded at its emitter.

The electric circuit unit 25 is also provided with an amplifying circuit 300 connected between the second coil 34 and the voltage-constant circuit 110 and with a triangular wave signal generator 400 connected between the voltage-constant circuit 110 and the rectangular wave pulse generator 200. The amplifying circuit 300 includes an operational amplifier 301 of which a first input terminal is connected to an output terminal 103 of the second coil 34 through an input resistor 305, a capacitor 309 and a filter composed of a resistor 308 and a capacitor 310. The filter is responsive to a series of the induction voltages from the second coil 34 to generate a series of sinusoidal wave signals (B) (See FIG. 6) at its output terminal.

The operational amplifier 301 is also connected at its second input terminal through an input resistor 306 to a voltage divider composed of resistors 302, 303. The voltage divider is cooperable with the constant-voltage circuit 110 to produce a divided standard voltage defined by the resistors 302, 303. When a series of sinusoidal wave signals (B) from the filter are applied to the first input terminal of amplifier 301 through the capacitor 309 and resistor 305 and the divided reference voltage from the voltage divider is applied to the second input terminal of amplifier 301 through the resistor 306, the amplifier 301 serves to amplify a series of the sinusoidal wave signals (B) into a series of amplified sinusoidal wave signals (C) (See FIG. 6) in relation to a resistor 304 which is connected between the capacitor 309 and the resistor 303 of the voltage divider. Additionally, a capacitor 311 is connected in parallel with the resistor 303, and a resistor 307 is connected between the second input and output terminals of amplifier 301.

The triangular wave signal generator 400 includes an operational amplifier 401 of which the first input terminal is connected to the output terminal of constant-voltage circuit 110 through an input resistor 405, a capacitor 406, and resistors 404, 403. The amplifier 401 is also connected at its second input terminal to the output terminal $Q_{10}$ of binary counter 211 through an input resistor 402. When the constant voltage from constant-voltage circuit 110 is applied to the first input terminal of amplifier 401 through the resistors 403, 404, capacitor 406 and resistor 405 and a series of the second pulse signals from binary counter 211 are applied to the second input terminal of amplifier 401 through the resistor 402, the amplifier 401 serves to generate a series of triangular wave signals (E) (See FIG. 6) with a time period which is defined by a time constant based on the resistor 402 and a capacitor 407 connected between the second input and output terminals of amplifier 401.

A peak hold circuit 350 includes an operational amplifier 351 of which the first input terminal is connected to the junction between the resistors 302, 303 of the divider through an input resistor 352 and a parallel connection of a resistor 354 with a capacitor 355. A diode 356 is connected between the input resistor 352 and the output terminal of amplifier 351. When the divided reference voltage from the resistor 303 is applied to the first input terminal of amplifier 351 through the resistor 354, capacitor 355 and resistor 352 and a series of the amplified sinusoidal wave signals (C) from amplifying circuit 300 are applied to the second input terminal of amplifier 351 through the resistor 353, the amplifier 356 serves to generate through the diode 356 a peak hold signal (D) (See FIG. 6) with a level corresponding to each of the negative peak values of the amplified sinusoidal wave signals (C), because the divided standard voltage from the resistor 303 is determined to be higher than each of the negative peak values of the amplified sinusoidal wave signals (C).

A rectangular wave pulse generator 500 includes an operational amplifier 501 of which the first input terminal is connected through an input resistor 502 to the diode 356 of peak hold circuit 350. The amplifier 501 is also connected at its second input terminal to the output terminal of amplifier 401 through an input resistor 503. A resistor 504 is connected between the second input and output terminals of amplifier 501. When the peak hold signal (D) from peak hold circuit 350 is applied through the input resistor 502 to the first input terminal of amplifier 501 and a series of the triangular wave signals (E) from triangular wave signal generator 400 are applied through the input resistor 503 to the second input terminal of amplifier 501, the operational amplifier 501 serves to generate a series of rectangular wave pulses (F) (See FIG. 6) in accordance with the level of the peak hold signal (D) related to a level of each of the triangular wave signals (E). This means that each of the rectangular wave pulses (F) has a pulse-width which is proportional to the level of the peak hold signal (D).

A switching circuit 550 includes a transistor 553 of which the collector is connected to the output terminal of constant-voltage circuit 110 through a resistor 553. The transistor 551 is connected at its base to the output terminal of operational amplifier 501 through a resistor 552, the emitter of transistor 551 being grounded. While the transistor 551 is turned off, the electric current from constant-voltage circuit 110 is applied to the electric elements of electric circuit unit 25 except for the switching circuit 550. When the transistor 551 is turned on in response to each of the rectangular wave pulses (F) from amplifier 501, the electric current from the constant-voltage circuit 110 is applied to all the electric elements of the electric circuit unit 25 including the switching circuit 550. In other words, the electric current flowing out from the constant-voltage circuit 110 during conduction of transistor 551 is more than that flowing out from the constant-voltage circuit 110 during nonconduction of transistor 551. This means that each of the output voltage signals (G) appearing at the terminal 53 of resistor 52 changes in a rectangular wave form in dependence upon changes of the electric current flowing into the constant-voltage circuit 110 from the battery 51 through the resistor 52 in relation to the nonconduction and conduction of transistor 551. In this case, the width of each of the output voltage signals (G) is defined by the pulse-width of each of the rectangular wave pulses (F).

In operation, when the detecting apparatus 1 is ready for operation, the inverter 202 of rectangular wave pulse generator 200 produces a series of oscillating signals, and the binary counter 211 is responsive to a series of the oscillating signals from inverter 202 to generate a series of first pulse signals (A) (See FIG. 6) at its output terminal $Q_1$ and also to generate a series of second pulse signals at its output terminal $Q_{10}$, as previously described. Then, a series of the first pulse signals (A) from the binary counter 211 are inverted by the inverter 212 and applied to the base of transistor 213 through the resistor 214 and capacitor 217 to intermittently conduct the transistor 213. Subsequently, the capacitor 218 serves to generate a series of reactangular wave pulses in response to the intermittent conduction of transistor 213 such that the first coil 28 produces magnetic fluxes therefrom, as previously described. When a series of the second pulse signals from the binary counter 211 are applied to the triangular wave signal generator 400, the signal generator 400 serves to produce a series of triangular wave signals (E) in relation to the time constant defined by the resistor 402 and capacitor 407, as previously described.

Assuming that any liquid is not stored within the liquid container 2, the torsion bar 10 of detecting apparatus 1 horizontally holds the container 2 without any torsion thereof by way of housings 14, 15 and stays 3, 4. Then, the first coil 28 is maintained at its original position such that the magnetic fluxes from the first coil 28 cross perpendicularly the axis of the second coil 34, as shown in (B) of FIG. 7. In other words, the second coil 34 does not produce any induction voltages, because any interlinkage of the magnetic fluxes from first coil 28 with the second coil 34 may not be formed at this stage. From this reason, the amplifying circuit 300 is maintained at the junction between the capacitors 309, 310 in the zero level, as shown by (b) of FIG. 6, and maintained at the output terminal of operational amplifier 301 in the divided standard voltage from the resistor 303, as shown by (c) of FIG. 6. The peak hold circuit 350 is also maintained at the junction between the resistors 352, 354 in the divided standard voltage from the resistor 303, as shown by (d) of FIG. 6, and the pulse generator 500 is maintained at the output terminal of amplifier 501 in the zero level, as shown by (f) of FIG. 6, to make the transistor 551 of switching circuit 550 nonconductive. This means that the resistor 52 is maintained at its terminal 53 in a constant level, as shown by (g) of FIG. 6, which defines no torsion of torsion bar 10.

When the container 2 is supplied with a quantity of liquid through its opening with release of the screw cap 6, the housings 14, 15 are rotated, around the torsion bar 10 in dependence upon the weight of the quantity of liquid supplied into the container 2, and the torsion bar 10 is twisted at its both end portions 11b, 11b by a torsional angle corresponding to the rotational angle of housings 14, 15, or the weight of the quantity of the supplied liquid. Then, the first coil 28 is displaced from the original position in dependence upon the torsional angle of torsion bar 10, as shown in (A) of FIG. 7, to increase the number of interlinkage of the magnetic fluxes from first coil 28 with the second coil 34. In this case, the increased number of the magnetic flux interlinkages with the second coil 34 corresponds to the torsional angle of torsion bar 10.

When the number of magnetic flux interlinkages with the second coil 34 is increased, as previously described, the second coil 34 produces a series of induction voltages which are applied to the amplifying circuit 300. Then, the amplifying circuit 300 is responsive to a series of the induction voltages from the second coil 34 to produce a series of sinusoidal wave signals (B) (See FIG. 6) at the junction between the capacitors 309, 310 and to produce a series of amplified sinusoidal wave signals (C) (See FIG. 6) at the output terminal of operational amplifier 301, as previously described. When a series of the amplified sinusoidal wave signals (C) from amplifying circuit 300 are applied to the peak hold circuit 350, the peak hold circuit 350 holds each of the negative peak values of the amplified sinusoidal wave signals (C) sequentially in relation to the divided standard voltage from the resistor 303 of amplifying circuit 300 to generate a peak hold signal (D) (See FIG. 6) with a level corresponding to each of the negative peak values of the amplified sinusoidal wave signals (C).

When a series of the triangular wave signals (E) from signal generator 400 and the peak hold signal (D) from peak hold circuit 350 are applied to the rectangular wave pulse generator 500, the pulse generator 500 serves to produce a series of rectangular wave pulses (F) (See FIG. 6) in accordance with the level of the peak hold signal (D) related to a level of each of the triangular wave signals (E). Then, the transistor 551 of switching circuit 550 is repetitively conducted in response to a series of the rectangular wave pulses (F) from pulse generator 500 to intermittently permit the flow of the electric current from the constant-voltage circuit 110 therethrough. This means that the electric current flowing into the constant-voltage circuit 110 from the battery 51 through the resistor 52 is intermittently increased upon each conduction of the transistor 551 to repetitively drop an electric voltage appearing at the terminal 53 of the resistor 52. Thus, the resistor 52 is responsive to each of the voltage drops thereof to repetitively produce an output voltage signal (G) (See FIG. 6) with a signal-width which corresponds to the pulse-width of each of the rectangular wave pulses (F) from pulse generator 500. In other words, the resistor 52 is responsive to the repetitive voltage drops thereof to generate a series of output voltage signals (G) of which each has a signal-width defining the quantity of the supplied liquid.

Although in the above embodiment the triangular wave signal generator 400 is connected between the rectangular wave pulse generators 200 and 500, it may be replaced with a saw-toothed wave signal generator which is responsive to a series of the second pulse signals from the binary counter 211 of pulse generator 200 to produce a series of saw-toothed wave signals to be applied to the pulse generator 500. In this case, the ceramic oscillator 203 of pulse generator 200 may be also replaced with a crystal oscillator, a CR oscillator, and the like.

While in the above embodiment the peak hold circuit 350 is connected between the amplifying circuit 300 and the rectangular wave pulse generator 500, it may be replaced with another peak hold circuit which serves to generate a peak hold signal with a level defined by each of the positive peak values of the amplified sinusoidal wave signals (C) from the amplifying circuit 300.

Although in the above embodiment the first coil 28 is responsive to a series of the rectangular pulses from rectangular wave pulse generator 200 to generate magnetic fluxes therefrom, generation of the magnetic fluxes from first coil 28 may be also conducted in responsive to, for instance, a series of sinusoidal wave signals issued from an appropriate sinusoidal wave signal generator.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An apparatus for detecting a quantity of liquid stored within a container, comprising:
    a torsion bar mounted on a stationary structure for supporting said container thereon in such a manner that said torsion bar is twisted at a torsional angle in dependence upon the weight of the stored liquid within said container; and
    an electric detector for electrically detecting the torsional angle of said torsion bar to generate an output signal indicative of the quantity of the stored liquid based on the detected torsional angle.

2. An apparatus as claimed in claim 1, wherein said electric detector comprises:
    a signal generator for generating a series of electric signals;
    first and second coils respectively mounted on said stationary structure and a portion of said container, one of said coils being arranged to produce magnetic fluxes therefrom in response to each of the electric signals from said signal generator, and the other coil being arranged to be in an interlinkage relationship with the magnetic fluxes and to detect the number of magnetic fluxes in its interlinkage caused by relative displacements between said coils so as to produce an electric signal indicative of the detected number of the magnetic fluxes; and means for generating an output signal indicative of the quantity of the stored liquid in response to the electric signal from the said other coil.

3. An apparatus as claimed in claim 2, wherein said means for generating an output signal indicative of the quantity of the stored liquid includes a peak hold circuit responsive to the electric signal from the said other coil for holding the peak level of the electric signal from the said other coil to produce a peak hold signal indicative of the peak level as the output signal indicative of the quantity of the stored liquid.

4. An apparatus as claimed in claim 2, further including a triangular wave signal generator responsive to each of the electric signals from said signal generator for generating a triangular wave signal therefrom; and wherein said means for generating an output signal indicative of the quantity of the stored liquid includes;

a peak hold circuit responsive to the electric signal from the said other coil for holding the peak level of the electric signal from the said other coil to produce a peak hold signal indicative of the peak level;

a rectangular wave pulse generator responsive to the peak hold signal from said peak hold circuit and the triangular wave signal from said triangular wave signal generator for generating a rectangular wave pulse with a pulse-width defined by a level of the peak hold signal related to a level of the triangular wave signal; and a current detection circuit responsive to the rectangular wave pulse from said rectangular wave pulse generator for detecting the value of an electric current flowing therethrough in relation to the pulse-width of the rectangular wave pulse to produce an electric signal indicative of the value of the electric current as the output signal indicative of the quantity of the stored liquid.

5. An apparatus as claimed in claim 1, wherein said container is integrally provided with a pair of stays and a housing secured at its opposite ends to the stays of said container, and said torsion bar is assembled within said housing and fixedly supported at its central portion on said stationary structure, said torsion bar being connected at its opposite ends to the stays of said container to be twisted in dependence upon gravity of the stored liquid in said container; and wherein said electric detector comprises:

a signal generator for generating a series of electric signals;

first and second coils respectively mounted on the central portion of said torsion bar and a portion of said housing confronting the central portion of said housing, one of said coils being arranged to produce magnetic fluxes therefrom in response to each of the electric signals from said signal generator, and the other coil being arranged to be in an interlinkage relationship with the magnetic fluxes and to detect the number of magnetic fluxes in its interlinkage caused by relative displacements between said coils so as to produce an electric signal indicative of the detected number of the magnetic fluxes; and means for generating an output signal indicative of the quantity of the stored liquid in response to the electric signal from the said other coil.

* * * * *